(12) United States Patent
Tu et al.

(10) Patent No.: US 6,794,783 B2
(45) Date of Patent: Sep. 21, 2004

(54) FLAT ROTARY ELECTRIC GENERATOR

(75) Inventors: Yu-Ta Tu, Hsinchu Hsien (TW); Show-Jong Yeh, Hemet, CA (US)

(73) Assignee: Sunyen Co., Ltd., Taipei (TW)

( * ) Notice: Subject to any disclaimer, the term of this patent is extended or adjusted under 35 U.S.C. 154(b) by 0 days.

(21) Appl. No.: 10/340,628

(22) Filed: Jan. 13, 2003

(65) Prior Publication Data

US 2004/0135452 A1 Jul. 15, 2004

(30) Foreign Application Priority Data

Jan. 10, 2003 (TW) .......................................... 092100564

(51) Int. Cl.$^7$ .............................................. G09B 23/18
(52) U.S. Cl. ................... 310/156.32; 310/268; 310/201
(58) Field of Search ........................... 310/156.32, 268, 310/201, 164, 261

(56) References Cited

U.S. PATENT DOCUMENTS

| | | | |
|---|---|---|---|
| 4,996,457 A | * | 2/1991 | Hawsey et al. ............. 310/268 |
| 5,184,040 A | | 2/1993 | Lim ............................ 310/114 |
| 5,245,238 A | | 9/1993 | Lynch et al. ................ 310/116 |
| 5,289,069 A | | 2/1994 | Hasegawa et al. .......... 310/156 |
| 5,334,898 A | | 8/1994 | Skybyk ....................... 310/268 |
| 5,396,140 A | | 3/1995 | Goldie et al. ............... 310/268 |
| 5,619,087 A | * | 4/1997 | Sakai .......................... 310/268 |
| 5,977,684 A | | 11/1999 | Lin ............................ 310/268 |
| 5,982,074 A | | 11/1999 | Smith et al. ................ 310/261 |
| 6,404,089 B1 | | 6/2002 | Tomion ...................... 310/162 |

* cited by examiner

Primary Examiner—Thanh Lam
(74) Attorney, Agent, or Firm—Bacon & Thomas, PLLC

(57) ABSTRACT

A flat rotary electric generator includes at least one toroidal coil structure for cutting magnetic lines to induce a current and at least one disc-shaped magnetic pole structure oriented parallel to the helical coil structure. If multiple toroidal coil structures and disc-shaped magnetic coil structures are included, the toroidal coil structures and disc-shaped magnetic coil structures are arranged in alternating manner. The toroidal coil structure and disc-shaped magnetic pole structure are not provided with a permeable material. When either the toroidal coil structures or the at least one disc-shaped magnetic pole structure is rotated by an external force, the toroidal coil structure cuts the magnetic lines passing therethrough to generate an induced current.

16 Claims, 6 Drawing Sheets

FLAT ROTARY ELECTRIC GENERATOR

BACKGROUND OF THE INVENTION

1. Field of the Invention

The present invention relates to a flat rotary electric generator and, more specifically to a flat rotary electric generator which generates a current by using at least one core-less helically-wound toroidal coil structure to cut magnetic lines generated by at least one coaxial disc-shaped pole structure so as to reduce the size and increase the efficiency of the generator.

2. Description of the Related Art

An electric generator is a machine which converts magnetic energy into electrical energy and basically utilizes Faraday's Law and Lenz's Law to effect the generation of electricity.

There are a wide variety of electric generators; however, in general, the electric generators are classified into rotary electric generator systems and linear electric generator systems.

In a common type of rotary electric generator, the windings (stators) thereof are distributed around a circle and a magnetic rotor is provided at the center thereof. In order to operate the electric generator, magnetic lines are introduced by the windings into a permeable material such as, for example, a silicon steel sheet or core inside the windings. However, this will generate an attractive force between the magnetic rotor and the permeable material and therefore cause a resistant force against the rotation of the rotor. This resistant force can be decreased by shortening the distance between the permeable material and the rotor, but in that case the number of magnetic lines crossed is decreased, and therefore there will be no increase in the induced electromotive force.

As described above, the conventional electric generator utilizes rotation of the magnetic rotor to generate an induced current on the winding of the stator. However, the conventional electric generator of a silicon steel sheet or other magnetically permeable core as a medium for the magnetic lines of force increases the weight of the generator and results in eddy current loss that may increase the torque in operation. Additionally, the core magnetic loss and eddy current loss in the permeable material may also reduce the efficiency for generating the electricity. As result, the efficiency of the conventional generator is too low for practical use as a mini-electric generator. In order to solve the above disadvantages, it is necessary to develop a flat electric generator with high efficacy which is applicable as a mini-electric electric generator and in compliance with the requirement for a light, thin, short and small electric generator.

SUMMARY OF THE INVENTION

In view of the above problems, the object of the invention is to provide a flat rotary electric generator capable of generating a current by using a helically-wound toroidal coil structure to cut magnetic lines generated by a coaxial rotary disc-shaped magnetic pole structure.

For achieving the above object according to an aspect of the invention, a flat rotary electric generator is provided, comprising: at least one toroidal coil structure for cutting magnetic lines to induce a current; at least one disc-shaped magnetic pole structure oriented in parallel with the toroidal coil structure and located on the side of the toroidal coil structure, wherein the magnetic lines produced by the at least one disc-shaped magnetic pole structure can pass through the at least one toroidal coil structure, when the disc-shaped magnetic pole structure is rotated by an external force such as mechanical force, hydraulic force or wind force, and the toroidal coil can cut the magnetic lines passing therethrough to generate an induced current.

Further, according to another aspect of the invention, the electric generator has no silicon steel sheet or other magnetically permeable core.

Further, according to another aspect of the invention, the electric generator includes a plurality of toroidal windings and disc-shaped pole structures which are arranged in alternating and parallel manner.

Further, according to another aspect of the invention, the at least one disc-shaped pole structure includes at least two magnetic poles arranged in alternating fashion, or pairs of alternating poles arranged in series.

Further, according to another aspect of the invention, magnets of the disc-shaped magnetic pole structure can comprise separate pole structures joined to form a disc, or a single disc-shaped structure magnetized to form the poles.

Further, according to another aspect of the invention, the toroidal coil structure is fixed and the disc-shaped magnetic pole structure is arranged to rotate, or the disc-shaped magnetic pole structure is fixed and the toroidal coil structure is arranged to rotate and the toroidal coil structure and the disc-shaped magnetic pole structure are co-axial.

Thus, the invention is capable of solving the disadvantages of a conventional rotary electric generator, such as the low efficiency, high cost, and large size caused by the use of permeable material in the conventional generator.

BRIEF DESCRIPTION OF THE INVENTION

Figures 5A, 5B:
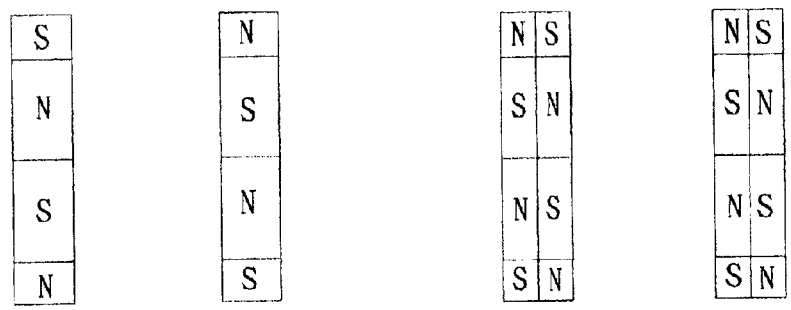
Figures 6A, 6B:
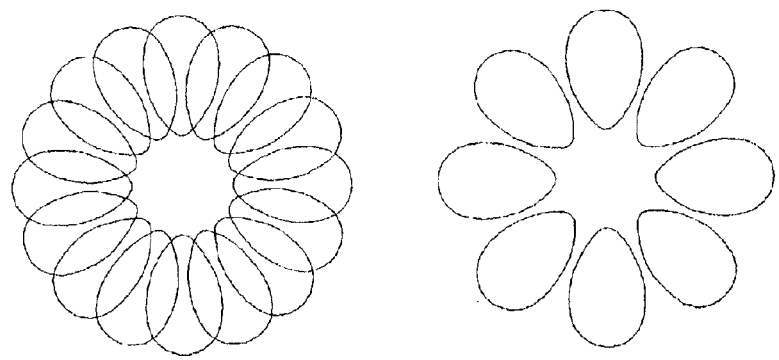

FIGS. 5(a) and 5(b) are schematic drawings, showing the section view of the disc-shaped magnetic pole structure of the invention; and FIGS. 6(a) and 6(b) are schematic drawings, showing the winding structure of the winding disc of the invention.

Figure 7:
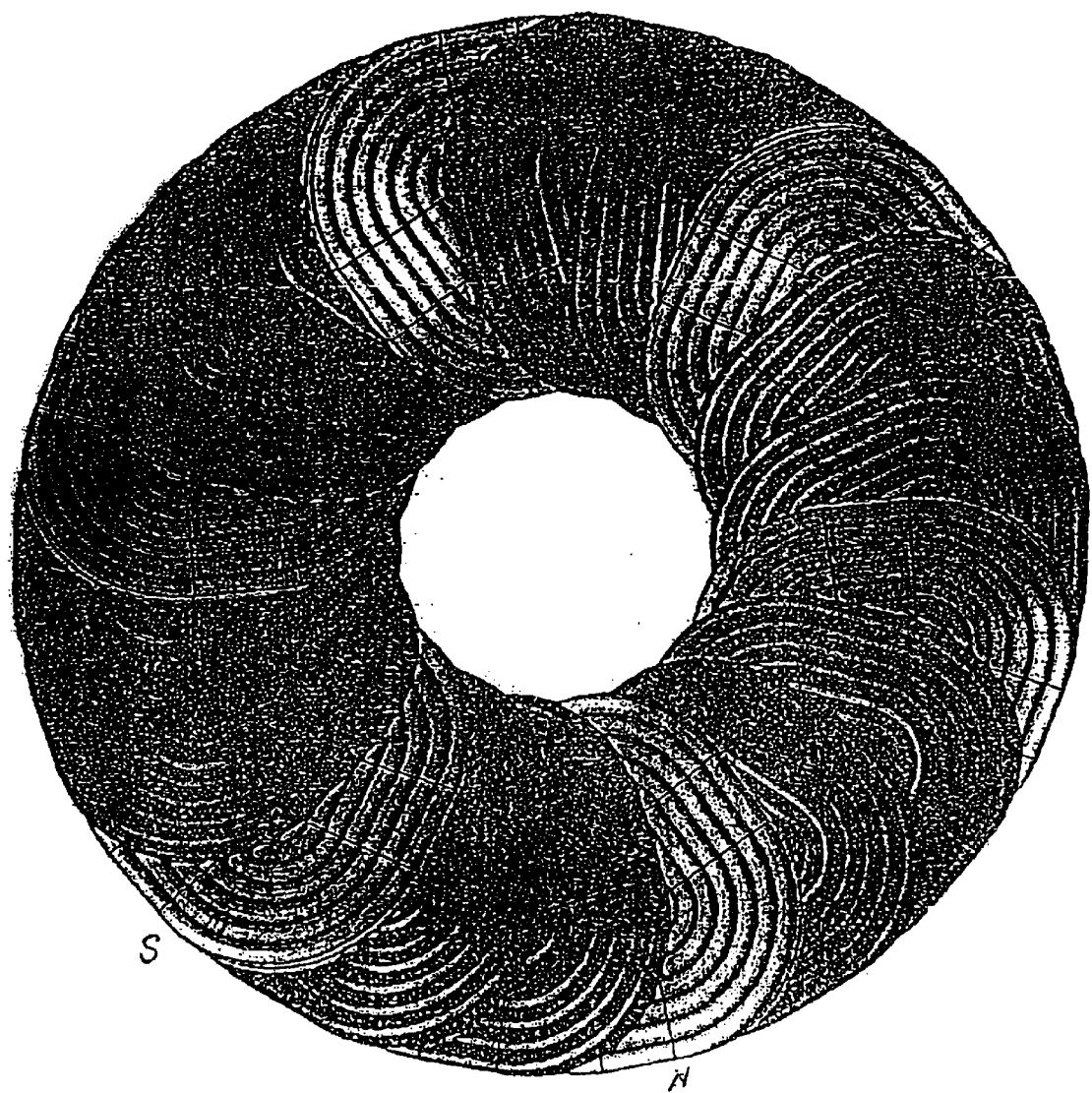

FIG. 7 is a top view of a three-phase toroidal coil corresponding to the coil illustrated in FIG. 6(a).

Figure 8:
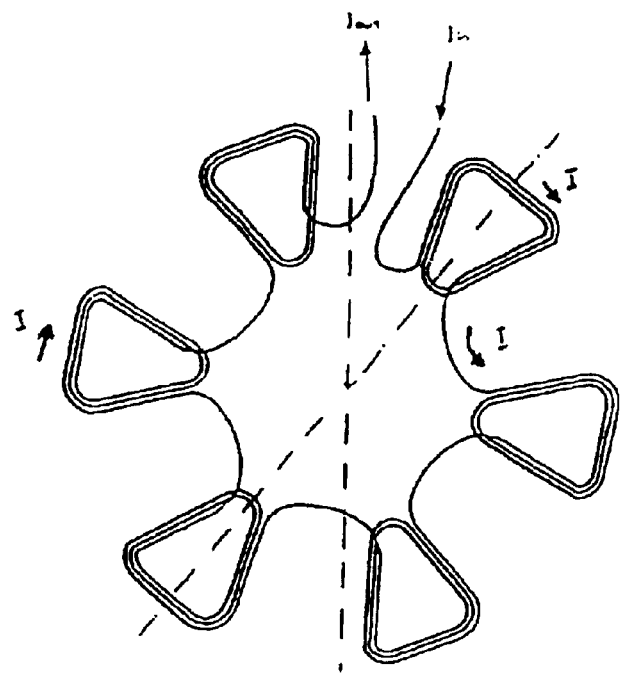

FIG. 8 is a schematic drawing of a single winding of the coil illustrated in FIG. 7, with indicated current directions.

Figure 1:
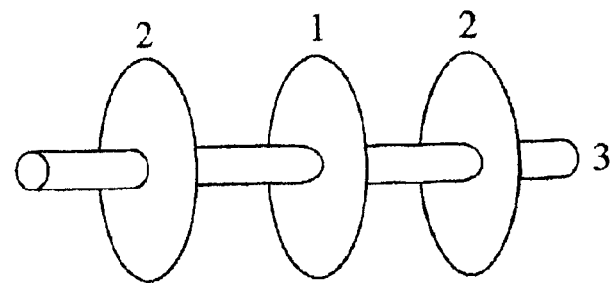
FIG. 1 is a schematic drawing, showing the structure of one preferred embodiment according to the invention.
Figure 9A:
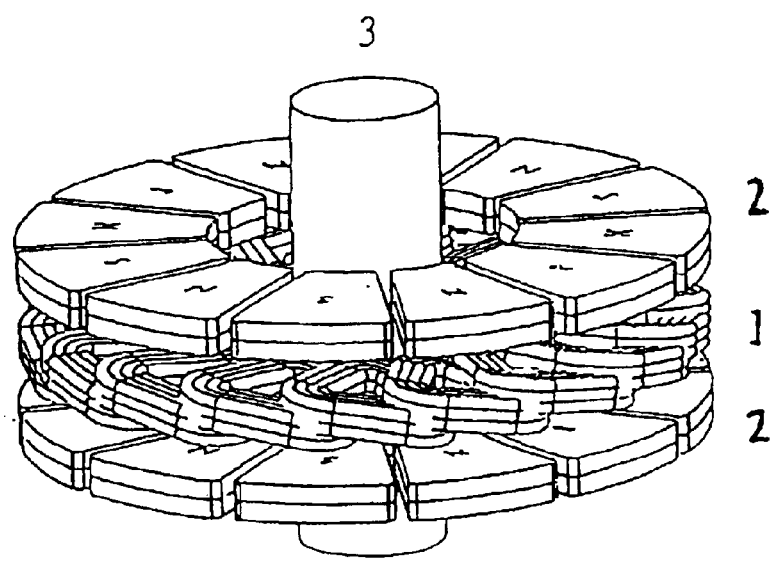

FIG. 9a is a perspective view of a generator structure corresponding to the structure illustrated schematically in FIG. 1.

Figure 9B:
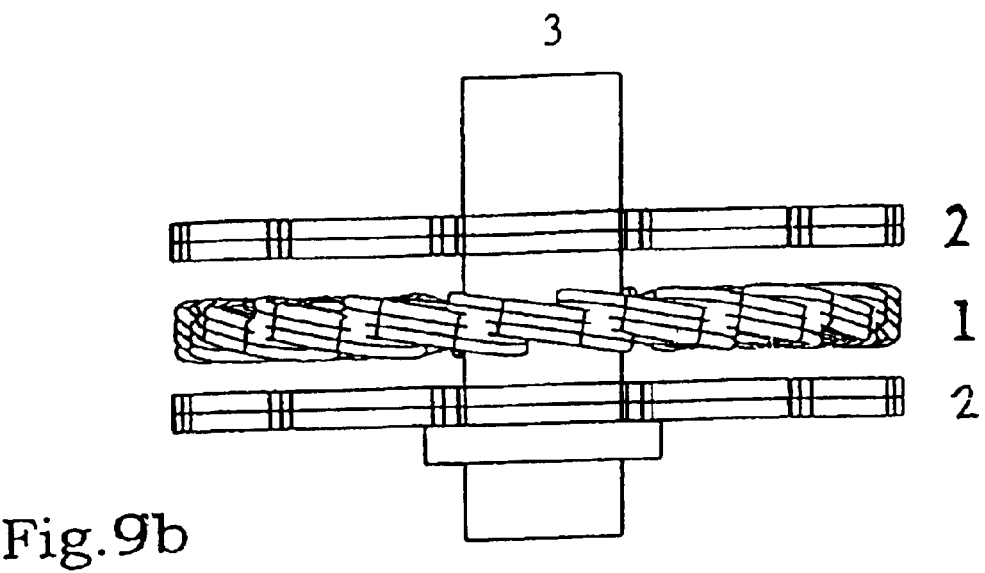

FIG. 9b is a side view of the generator structure of FIG. 9a.

Figure 9C:
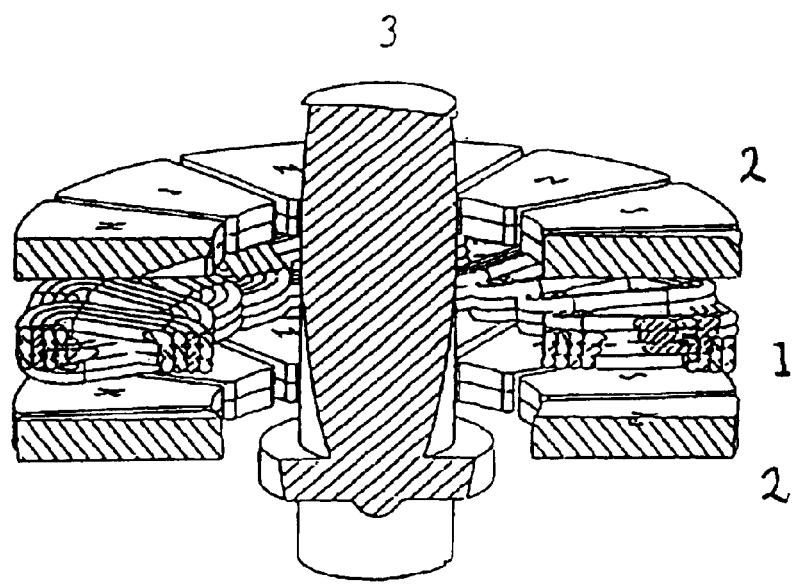

FIG. 9c is a cross-sectional view of the generator structure of FIG. 9a.

Figure 2:
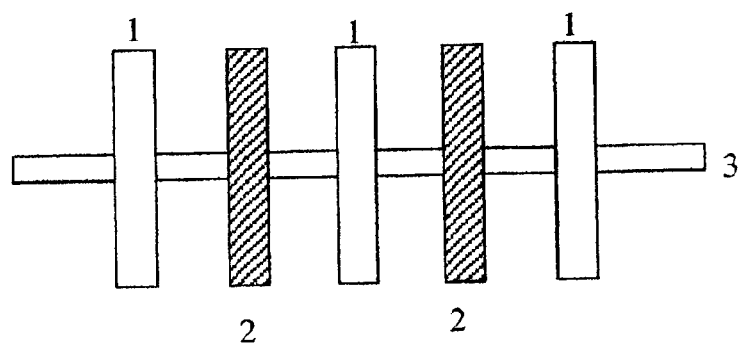
FIG. 2 is a schematic drawing, showing the structure of another embodiment according to the invention.
Figure 10A:
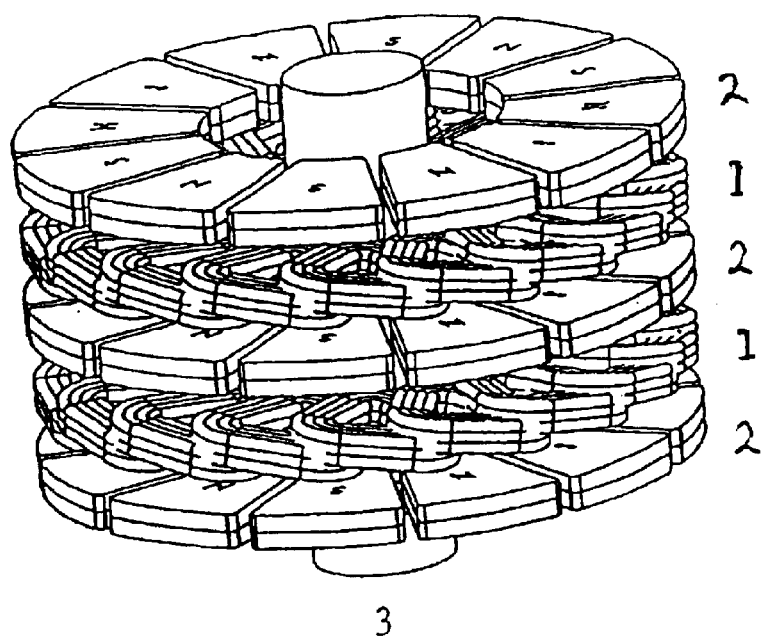

FIG. 10a is a perspective view of the generator structure illustrated in FIG. 2.

Figure 10B:
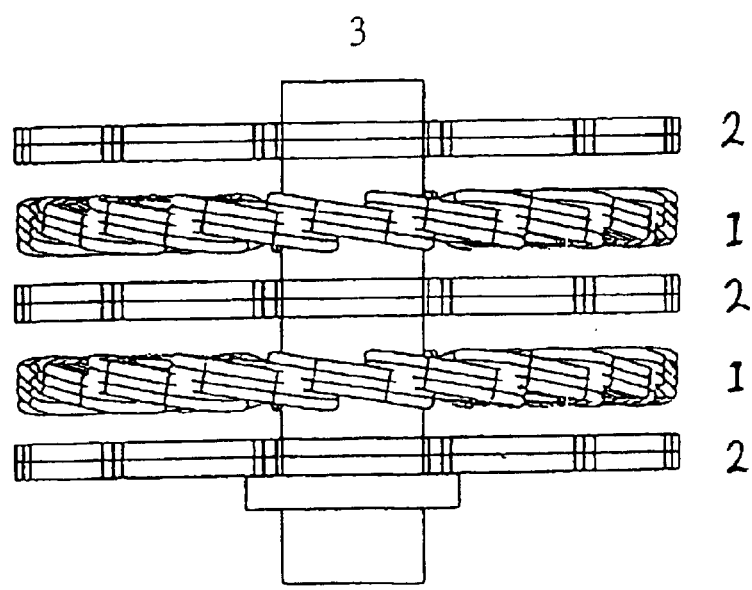

FIG. 10b is a side view of the generator structure of FIG. 10a.

DETAILED DESCRIPTION OF THE INVENTION

Generally, the induced electromotive force can be based on Faraday's Law:

$$E = -N\left(\frac{d\phi}{dt}\right) \times 10^{-8}$$

(wherein E represents the electromotive force, N represents the number of windings, $\phi$ represents flux, and t represents time.)

Because the magnetic lines are varied by the cutting angle of the rotating magnetic field, the electromotive forces are not identical. The regular variation of the electromotive force can be indicated by the number of magnetic lines ($\Phi$) that are cut, which is given by $\phi = \Phi_{max} \cdot \cos(\omega \cdot t)$ (wherein $\omega$ represents rotating angular speed). Therefore, the relation between the electromotive force and rotating angular speed is given by $E = N \cdot \Phi \cdot \sin(\omega \cdot t) \times 10^{-8}$, and the effective electromotive force by $$E_{rms} = 4.44 \cdot f \cdot N \cdot \Phi \cdot \sin(\omega \cdot t) \times 10^{-8}$$

(where $f$ represents the rotating frequency of the magnetic disc-shaped pole structure). In order to maximize the number of magnetic lines $\Phi$, it is thus necessary to improve the efficiency of conduction of the loops formed by the magnetic field.

According to the invention, the magnetic induction uses an air core as the medium. Preferably, to allow more magnetic lines to pass through the coil, a disc-shaped magnetic pole structure is arranged on each side of toroidal coil structural so that the magnetic lines pass from one magnetic pole structure to the other through the helical coil structure to form a multi-disc-shaped magnetic pole structure, although those skilled in the art will appreciate that a single disc-shaped pole structure can also be used.

If there is no core or silicon steel sheet, the electromotive force can be obtained by the rotating speed and the magnetic force:

$$E_{rms} = 4.44 \cdot N \cdot \Phi \times 10^{-8}$$

Thus, the technology of the invention can obtain maximum flux and can be used as an electric generator in a variety of electronic products to decrease the use of batteries and reduce the pollution associated with electricity generation.

The following will describe the preferred embodiment of the invention according to the drawings. However, the invention is not restricted thereby. The person who is skillful in this technology can modify or change it without departing from the scope of the invention.

FIGS. 1 and 9a–9c illustrate the structure of a preferred embodiment according to the invention. The flat rotary electric generator comprises toroidal coil structure 1 and coaxial disc-shaped magnetic pole structure 2. Toroidal coil structure 1 may include a single helical winding, or multiple series-connected helical windings, as illustrated in FIG. 7. When the toroidal coil structure 1 is fixed, the disc-shaped magnetic pole structure 2 is rotary. On the other hand, when the toroidal coil structure 1 is rotary, the disc-shaped magnetic pole structure 2 is fixed. The helical coil structure 1 is used, in this example, for cutting magnetic lines between two disc-shaped magnetic pole structures 2 to induce the current although a single such pole structure can be used instead. The disc-shaped magnetic pole structure 2 is oriented parallel to and located on the side of the toroidal structure 1. The disc-shaped magnetic pole structure 2 and the helical or toroidal coil structure 1 has an air core which does not employ any permeable material. The magnetic lines produced by the two disc-shaped magnetic pole structures can pass through the helical or toroidal coil structure. When the disc-shaped magnetic poles structures, or the toroidal coil structure are rotated by external force, the toroidal coil structure 1 cuts the magnetic lines and induces a current I, shown in FIG. 8, in each winding of the coil structure. The external force may include a vibrating force, a swinging force, or any other force that causes relative movement of the coil and magnetic pole structure or structures.

FIGS. 2, 10a, and 10b illustrate another embodiment of the invention, in which the electric generator again has no permeable materials such as a silicon steel sheet or other permeable core structure, and in which the electric generator again has no permeable materials such as a silicon steel sheet or other permeable core structure, and in which multiple helical coils and disc-shaped magnetic poles structures are arranged in alternating and parallel manner.

Figure 3:
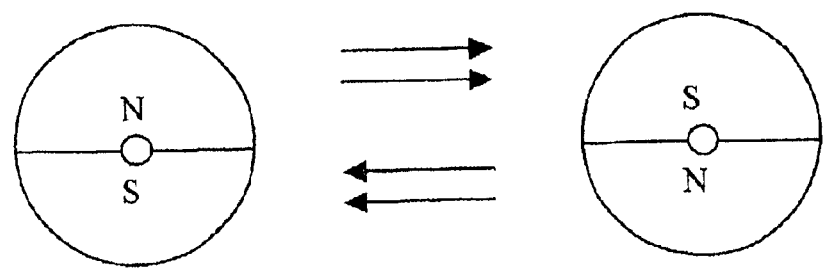
FIG. 3 is a schematic drawing, showing the operation of disc-shaped magnetic pole structure according to the invention.

FIG. 3 illustrates the operation of the disc-shaped magnetic pole structure 2 according to the invention. The magnetic poles of two disc-shaped magnetic pole structures 2 are opposite in polarity with each other so that when stopped or during rotation, poles of opposite polarity face each other. The toroidal coil structure 1 is located in-between these disc-shaped magnetic pole structures for cutting the magnetic lines. This figure only shows two poles on each disc-shaped magnetic pole structure 2, but the invention is not restricted thereto.

Figure 4:
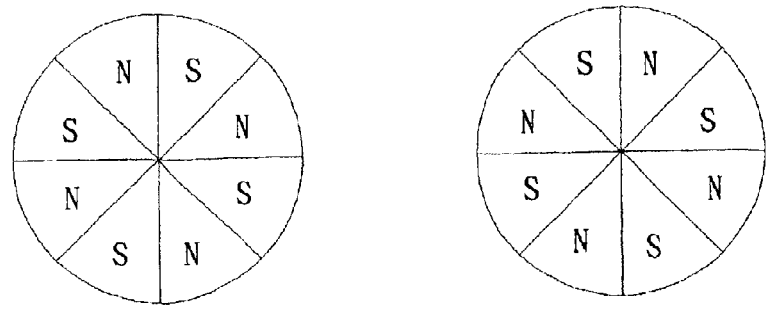
FIG. 4 is a schematic drawing, showing the planar structure of the disc-shaped magnetic pole structure of the invention.

FIG. 4 is a planar view of an example of a disc-shaped magnetic pole structure 2 according to the invention. Each magnetic pole in the disc-shaped magnetic pole structure 2 is a section bounded by two radii. FIGS. 5(a) and 5(b) are side views of FIG. 4. The sections of disc-shaped magnetic pole structure 2 are arranged in N-S series.

FIGS. 6(a) and 6(b) illustrate the winding structures of the toroidal coil structure 1 of the invention. FIG. 6(a) shows a circular winding structure and FIG. 6(b) shows a non-circular winding structure. In either case, the individual windings may be stacked or not, interlaced or not, or wound in any suitable configuration to form a toroidal coil structure. These windings can be wound on a material such as epoxy resin.

Finally, because the theory of a motor is similar to that of the electric generator, a motor can also be implemented by using the invention.

For example, the toroidal coil structure can be supplied with current from an external source such that the toroidal winding can generate a magnetic field. The disc-shaped magnetic pole structure will then rotate due to the repulsive force caused by that magnetic field.

Although a specific embodiment has been illustrate and described, it will be obvious to those skilled in the art that various modifications may be made without departing from spirit which is intended to be limited solely by the append claims.

What is claimed is:

1. A flat rotary electric generator, comprising: at least one toroidal coil structure, for cutting magnetic lines to induce a current; at least one disc-shaped magnetic pole structure having a plurality of poles of opposite polarity, said poles of opposite polarity facing said disc, and said disc being oriented parallel to the toroidal coil and located on one side thereof, and wherein when either the toroidal coil structure is rotated or the disc-shaped magnetic pole structure is rotated by external force, the toroidal coil structure cuts the magnetic lines passing through the toroidal coil structure to generate an induced current.

2. The flat rotary electric generator according to claim 1, wherein the electric generator lacks a magnetically permeable core.

3. The flat rotary electric generator according to claim 1, wherein the generator comprises a plurality of toroidal coil structures and disc-shaped magnetic pole structures arranged in alternating and parallel manner.

4. The flat rotary electric generator according to claim 1, wherein the disc-shaped magnetic pole structure includes at least two magnetic, poles arranged in sections bounded by radii of the disc-shape, and the sections of the disc-shaped magnetic pole structure each comprise a single N or S pole.

5. The flat rotary electric generator according to claim 1, wherein the disc-shaped magnetic pole structure sections each comprise at least two poles in series.

6. The flat rotary electric generator according to claim 1, wherein magnets of the disc-shaped magnetic poles structure comprise discrete structures joined together.

7. The flat rotary electric generator according to claim 1, wherein the disc-shaped magnetic pole structure comprises a single disc-shaped member magnetized to form alternating poles.

8. The flat rotary electric generator according to claim 1, wherein the toroidal coil structure is fixed and the disc-shaped magnetic pole structure rotates, and the toroidal coil and the disc-shaped magnetic pole structure are co-axial.

9. The flat rotary electric generator according to claim 1, wherein the toroidal coil structure rotates and the disc-shaped magnetic pole structure is fixed, and the toroidal coil structure and the disc-shaped magnetic pole structure are co-axial.

10. The flat rotary electric generator according to claim 1, wherein the external force includes vibration or a swinging force.

11. The flat rotary electric generator according to claim 1, wherein the toroidal coil structure includes circular windings connected in series.

12. The flat rotary electric generator according to claim 1, wherein the toroidal coil structure includes non-circular windings connected in series.

13. The flat rotary electric generator according to claim 1, wherein the toroidal coil structure includes a plurality of stacked windings.

14. The flat rotary electric generator according to claim 1, wherein the toroidal coil structure includes a plurality of non-stacked windings.

15. The flat rotary electric generator according to claim 1, wherein the toroidal coil structure includes a plurality of interlaced windings.

16. The flat rotary electric generator according to claim 1, wherein the toroidal coil structure includes a plurality of non-interlaced windings.

* * * * *